United States Patent
Yamagami

(10) Patent No.: US 8,296,265 B2
(45) Date of Patent: *Oct. 23, 2012

(54) METHOD AND APPARATUS FOR SYNCHRONIZING APPLICATIONS FOR DATA RECOVERY USING STORAGE BASED JOURNALING

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,055

(22) Filed: Jul. 12, 2011

(65) Prior Publication Data

US 2011/0271068 A1   Nov. 3, 2011

Related U.S. Application Data

(63) Continuation of application No. 12/473,415, filed on May 28, 2009, now Pat. No. 8,005,796, which is a continuation of application No. 11/365,085, filed on Feb. 28, 2006, now Pat. No. 7,555,505, which is a continuation of application No. 10/627,507, filed on Jul. 25, 2003, now abandoned.

(51) Int. Cl.
*G06F 7/00* (2006.01)
*G06F 17/00* (2006.01)

(52) U.S. Cl. ........................ 707/648

(58) Field of Classification Search .............. None
See application file for complete search history.

(56) References Cited

U.S. PATENT DOCUMENTS

| | | |
|---|---|---|
| 4,077,059 A | 2/1978 | Cordi et al. |
| 4,823,261 A | 4/1989 | Bank et al. |
| 5,065,311 A | 11/1991 | Masai et al. |
| 5,086,502 A | 2/1992 | Malcolm |
| 5,263,154 A | 11/1993 | Eastridge et al. |
| 5,369,757 A | 11/1994 | Spiro et al. |
| 5,404,508 A | 4/1995 | Konrad et al. |
| 5,479,654 A | 12/1995 | Squibb |
| 5,551,003 A | 8/1996 | Mattson et al. |
| 5,555,371 A | 9/1996 | Duyanovich et al. |
| 5,644,696 A | 7/1997 | Pearson et al. |
| 5,664,186 A | 9/1997 | Bennett et al. |
| 5,680,640 A | 10/1997 | Ofek et al. |
| 5,701,480 A | 12/1997 | Raz |
| 5,720,029 A | 2/1998 | Kern et al. |
| 5,751,997 A | 5/1998 | Kullick et al. |
| 5,835,953 A | 11/1998 | Ohran |

(Continued)

FOREIGN PATENT DOCUMENTS

JP   03-103941 A   4/1991

(Continued)

OTHER PUBLICATIONS

U.S. Appl. No. 09/588,242, filed Jun. 6, 2000, Poston.

(Continued)

*Primary Examiner* — Syed H Hasan
(74) *Attorney, Agent, or Firm* — Mattingly & Malur, PC

(57) ABSTRACT

Disclosed is a method to synchronize the state of an application and an application's objects with data stored on the storage system. The storage system provides API's to create special data, called a marker journal, and stores it on a journal volume. The marker contains application information, e.g. file name, operation on the file, timestamp, etc. Since the journal volume contains markers as well as any changed data in the chronological order, IO activities to the storage system and application activities can be synchronized.

16 Claims, 11 Drawing Sheets

Relationship between snapshot and journal

U.S. PATENT DOCUMENTS

| | | | |
|---|---|---|---|
| 5,867,668 A | 2/1999 | Spirakis et al. |
| 5,870,758 A | 2/1999 | Bamford et al. |
| 5,987,575 A | 11/1999 | Yamaguchi |
| 5,991,772 A | 11/1999 | Doherty et al. |
| 6,081,875 A | 6/2000 | Clifton et al. |
| 6,128,630 A | 10/2000 | Shackelford |
| 6,154,852 A | 11/2000 | Amundson et al. |
| 6,189,016 B1 | 2/2001 | Cabrera et al. |
| 6,269,381 B1 | 7/2001 | St. Pierre et al. |
| 6,269,431 B1 | 7/2001 | Dunham |
| 6,298,345 B1 | 10/2001 | Armstrong et al. |
| 6,301,677 B1 | 10/2001 | Squibb |
| 6,324,654 B1 | 11/2001 | Wahl et al. |
| 6,353,878 B1 | 3/2002 | Dunham |
| 6,397,351 B1 | 5/2002 | Miller et al. |
| 6,442,706 B1 | 8/2002 | Wahl et al. |
| 6,473,775 B1 | 10/2002 | Kusters et al. |
| 6,539,462 B1 | 3/2003 | Mikkelsen et al. |
| 6,560,614 B1 | 5/2003 | Barboy et al. |
| 6,587,970 B1 | 7/2003 | Wang et al. |
| 6,594,781 B1 | 7/2003 | Komasaka et al. |
| 6,658,434 B1 | 12/2003 | Watanabe et al. |
| 6,665,815 B1 | 12/2003 | Goldstein et al. |
| 6,691,245 B1 | 2/2004 | DeKoning |
| 6,711,409 B1 | 3/2004 | Zavgren et al. |
| 6,711,572 B2 | 3/2004 | Zakharov et al. |
| 6,728,747 B1 | 4/2004 | Jenkins et al. |
| 6,732,125 B1 | 5/2004 | Autrey et al. |
| 6,742,138 B1 | 5/2004 | Gagne et al. |
| 6,816,872 B1 | 11/2004 | Squibb |
| 6,829,819 B1 | 12/2004 | Crue et al. |
| 6,839,819 B2 | 1/2005 | Martin |
| 6,898,688 B2 | 5/2005 | Martin et al. |
| 6,915,315 B2 | 7/2005 | Autrey et al. |
| 6,971,018 B1 | 11/2005 | Witt et al. |
| 6,978,282 B1 | 12/2005 | Dings et al. |
| 6,981,114 B1 | 12/2005 | Wu et al. |
| 7,003,531 B2 | 2/2006 | Holenstein et al. |
| 7,036,043 B2 | 4/2006 | Martin et al. |
| 7,065,538 B2 | 6/2006 | Aronoff et al. |
| 7,181,476 B2 | 2/2007 | Lee et al. |
| 7,340,645 B1 | 3/2008 | Martin et al. |
| 7,555,505 B2 | 6/2009 | Yamagami |
| 2001/0010070 A1 | 7/2001 | Crockett et al. |
| 2001/0049749 A1 | 12/2001 | Katsuragi et al. |
| 2001/0056438 A1 | 12/2001 | Ito |
| 2002/0016827 A1 | 2/2002 | McCabe et al. |
| 2002/0078244 A1 | 6/2002 | Howard |
| 2002/0120850 A1 | 8/2002 | Walker et al. |
| 2003/0074523 A1 | 4/2003 | Johnson |
| 2003/0115225 A1 | 6/2003 | Suzuki et al. |
| 2003/0135650 A1 | 7/2003 | Kano et al. |
| 2003/0135783 A1 | 7/2003 | Martin et al. |
| 2003/0177306 A1 | 9/2003 | Cochrane et al. |
| 2003/0195903 A1 | 10/2003 | Manley et al. |
| 2003/0220935 A1 | 11/2003 | Vivian et al. |
| 2003/0229764 A1 | 12/2003 | Ohno et al. |
| 2004/0010487 A1 | 1/2004 | Prahlad et al. |
| 2004/0030837 A1 | 2/2004 | Geiner et al. |
| 2004/0044828 A1 | 3/2004 | Gibble et al. |
| 2004/0059882 A1 | 3/2004 | Kedem et al. |
| 2004/0068636 A1 | 4/2004 | Jacobson et al. |
| 2004/0088508 A1 | 5/2004 | Ballard et al. |
| 2004/0117572 A1 | 6/2004 | Welsh et al. |
| 2004/0128470 A1 | 7/2004 | Hetzler et al. |
| 2004/0133575 A1 | 7/2004 | Farmer et al. |
| 2004/0139128 A1 | 7/2004 | Becker et al. |
| 2004/0153558 A1 | 8/2004 | Gunduc et al. |
| 2004/0163009 A1 | 8/2004 | Goldstein et al. |
| 2004/0172577 A1 | 9/2004 | Tan et al. |
| 2004/0225689 A1 | 11/2004 | Dettinger et al. |
| 2004/0250033 A1 | 12/2004 | Prahlad et al. |
| 2004/0250182 A1 | 12/2004 | Lyle et al. |
| 2005/0027892 A1 | 2/2005 | McCabe et al. |
| 2005/0039069 A1 | 2/2005 | Prahlad et al. |
| 2005/0108302 A1 | 5/2005 | Rand et al. |
| 2005/0193031 A1 | 9/2005 | Midgley et al. |
| 2005/0256811 A1 | 11/2005 | Pagel et al. |

FOREIGN PATENT DOCUMENTS

| | | |
|---|---|---|
| JP | 05-002517 A | 1/1993 |
| JP | 11-353215 A | 12/1999 |
| JP | 2000-155708 A | 6/2000 |
| WO | WO03/092166 | 11/2003 |

OTHER PUBLICATIONS

"Continuous Data Protection: Business Continuity for the Era of Networked Storage," Aberdeen Group, Inc. Boston MA (Jul. 2003).

"Making ROI a Snap: Leveraging the Power of Snapshot Technology with ComVault TM, QiNetix TM, Quick Recovery," CommVault Systems, Inc. Oceanport, NJ (2002).

"QiNetix Quick Recovery: Snapshot Management and Recovery," CommVault Systems, Inc. Oceanport, NJ (2005).

"QiNetix: Quick Recovery for Microsoft Exchange," CommVault Systems, Inc. Oceanport, NJ (2003).

Bohannon et al. "Distributed Multi-Level Recovery in Main-Memory Databases," Proceedings of the 4th International Conference on Parallel and Distributed Information Systems, pp. 45-55 (1996).

Elnozahy et al "A Survey of Rollback-Recovery Protocols in Message-Passing Systems," ACM Computing Surveys 34:375-408 (Sep. 2002).

Hunnicutt et al, "Mission Data Storage Consolidation (MDSC)," Space Ops 2002 Conference, Paper ID: T2071 (2002).

Lomet et al "Efficient Transparent Application Recovery in Client-Server Information Systems," Proceedings of 1998 ACM SIGMOD International Conference on Management of Data, pp. 460-471 (1998).

Park et al "An Efficient Recovery Scheme for Mobile Computing Environments," Proceedings of the 8th International Conference on Parallel and Distributed Systems (2001).

Thatte "Persistent Memory: A Storage Architecture for Object-Oriented Database Systems," Proceedings of the ACM/IEEE International Workshop on Object-Oriented Database Systems, Pacific Grove, CA, pp. 148-159 (1986).

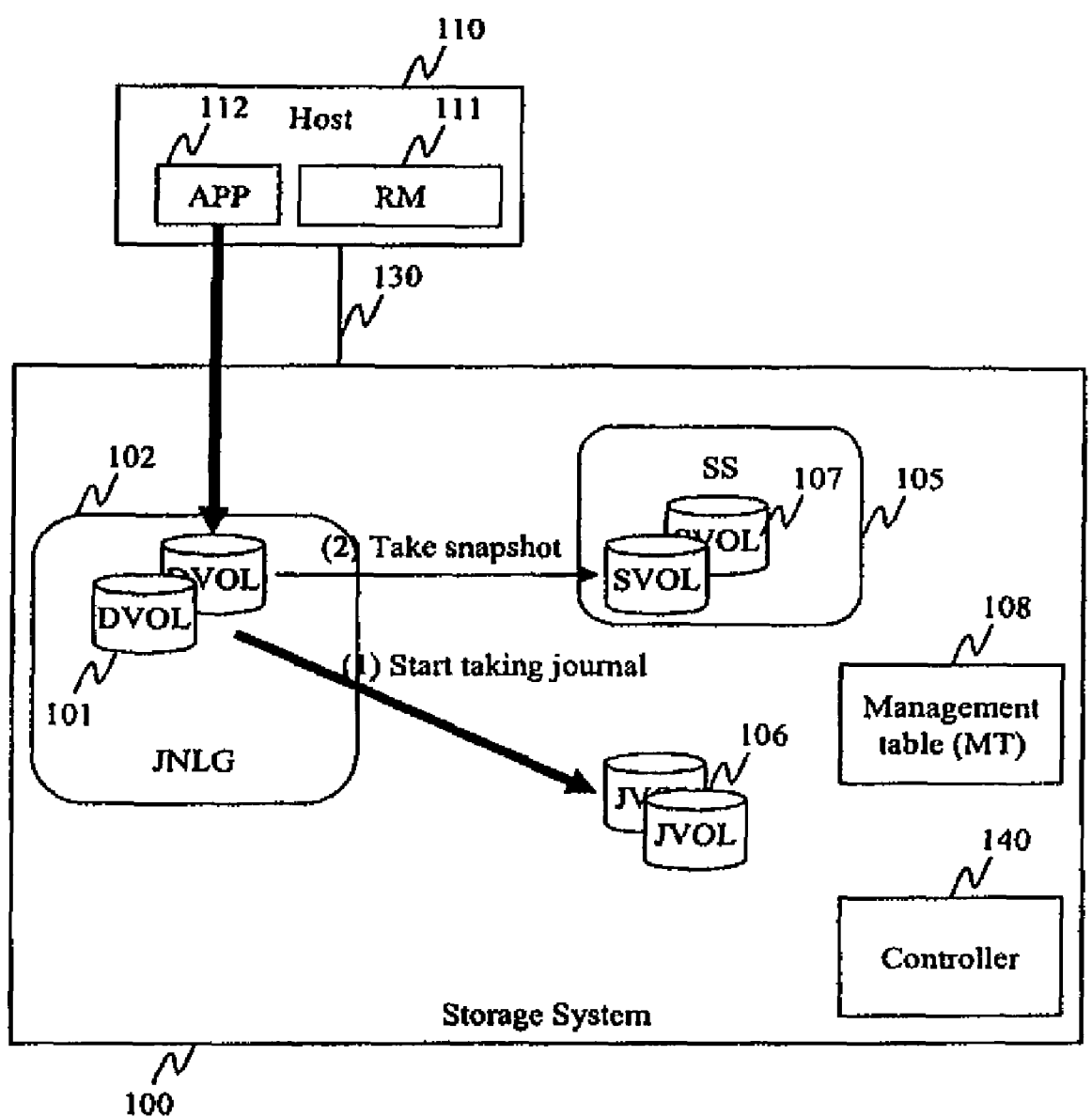
Fig. 1 Overview of backup

Fig. 2 Control Data for Journal
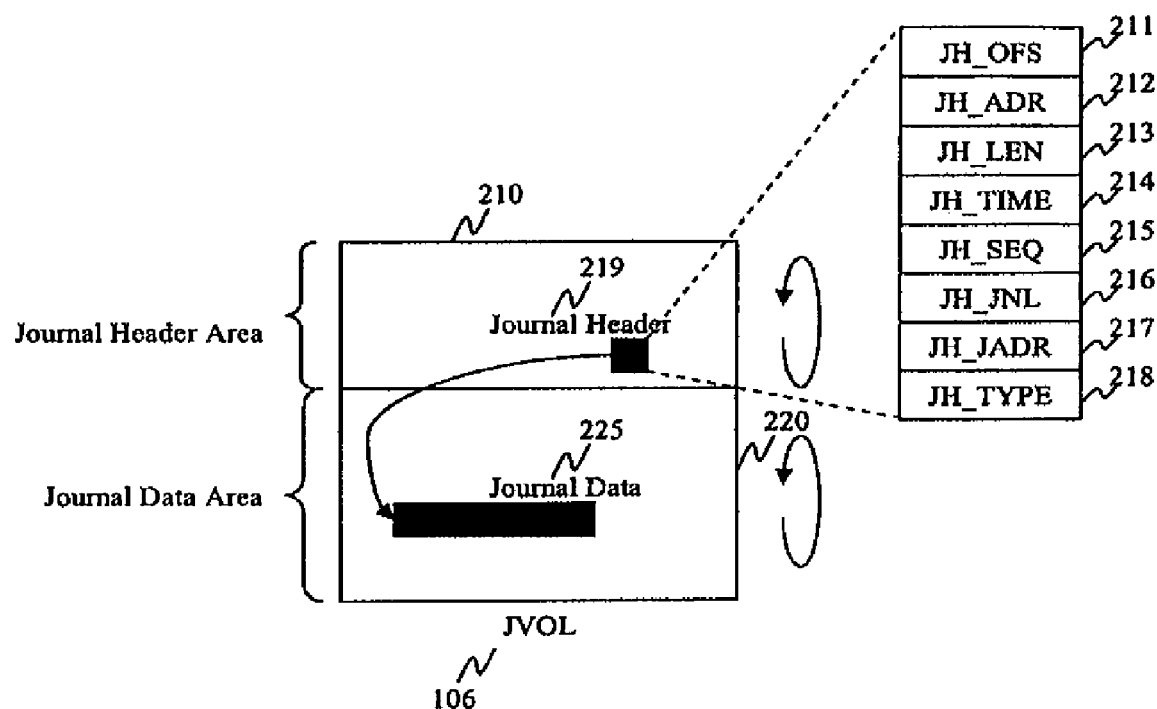

Fig. 3 MT(Management Table) 300
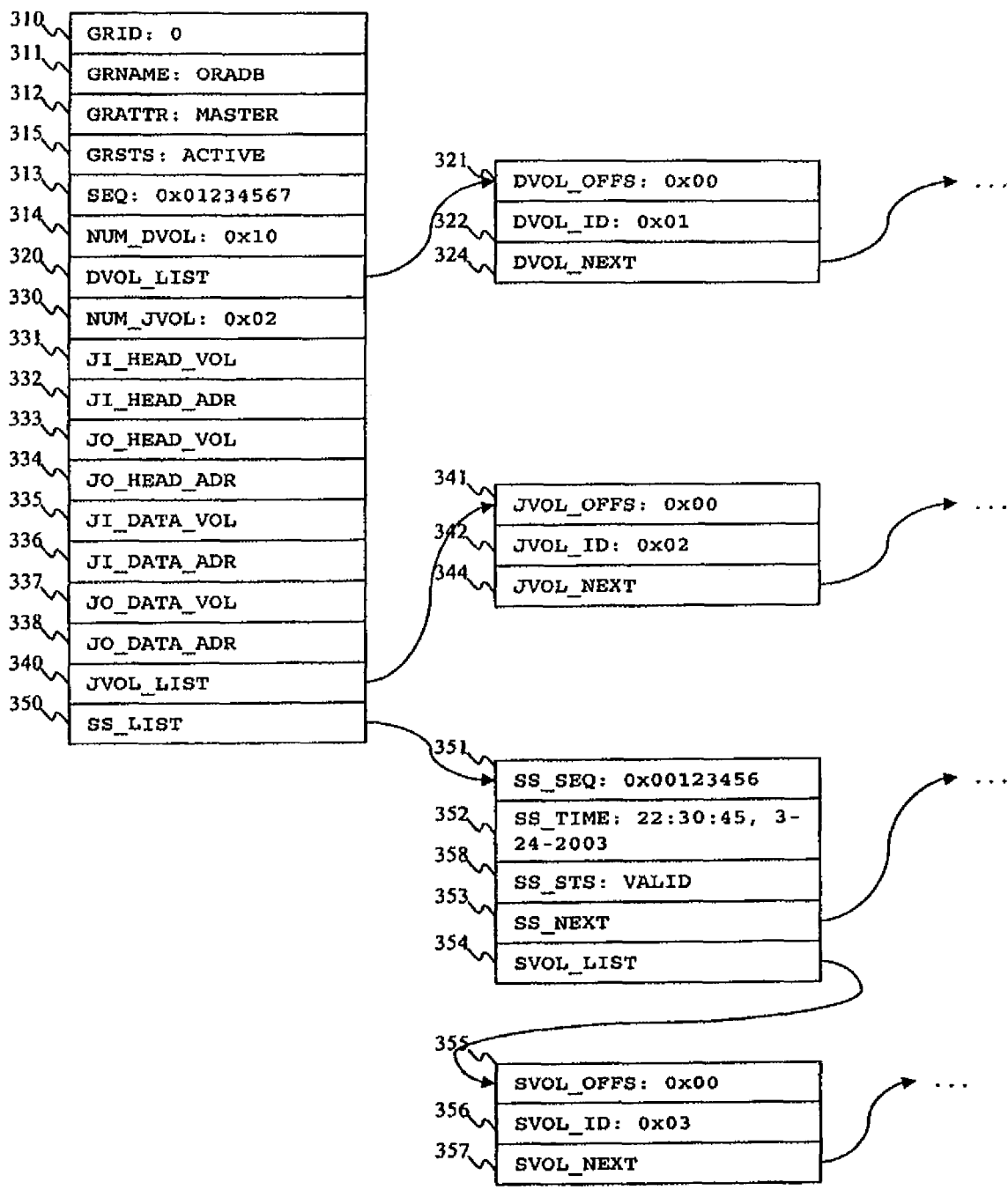

Fig. 4 Starting journal
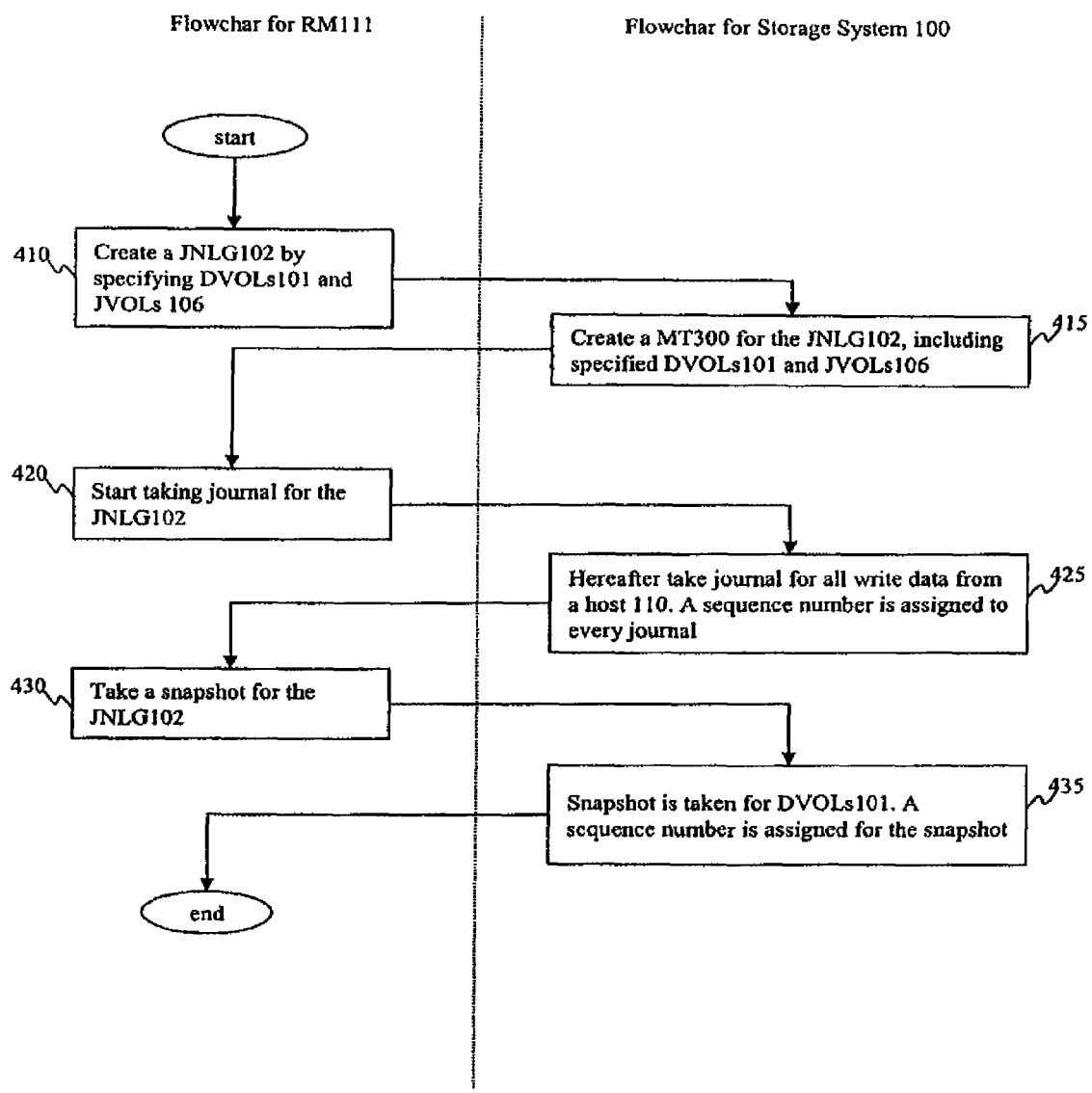

Fig. 5 Relationship between snapshot and journal
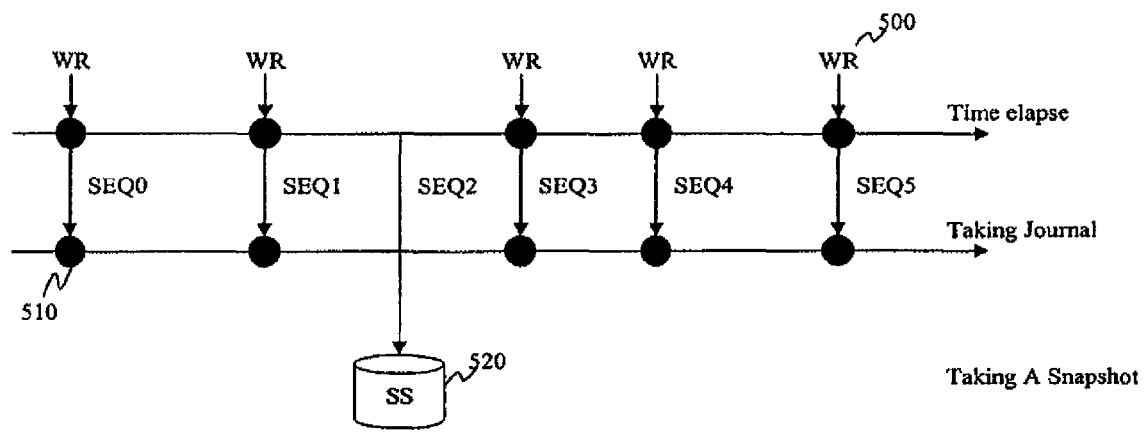
Fig. 5A Relationship between multiple snapshots and journal
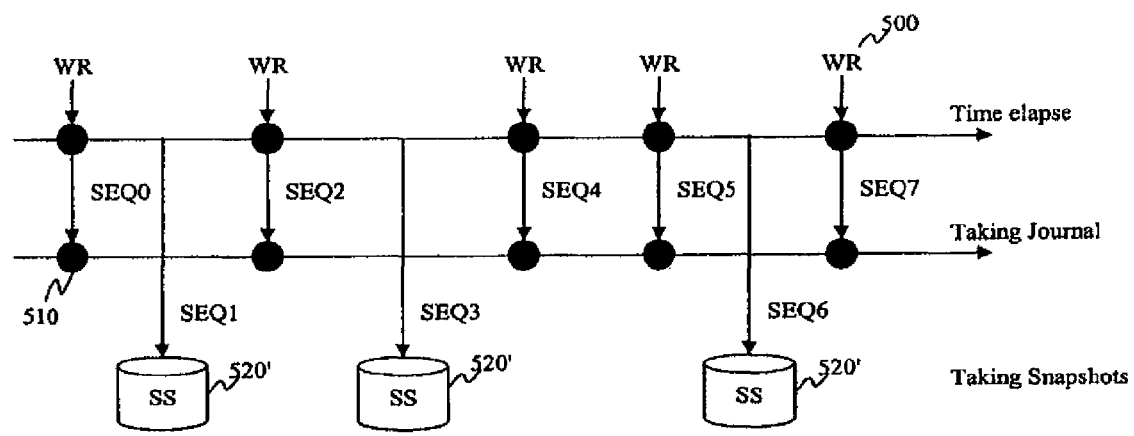

Fig. 6 Overflowing JNL
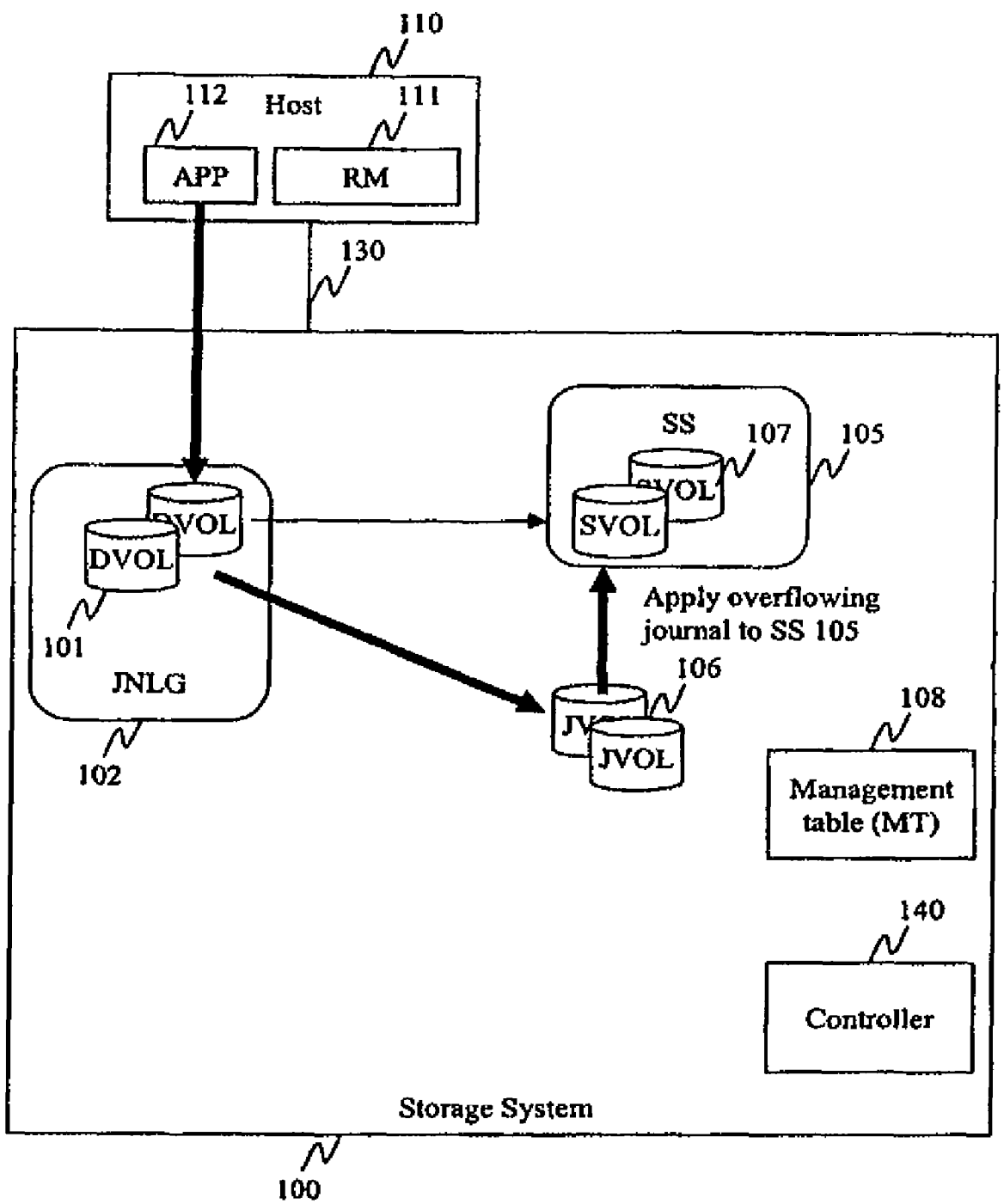

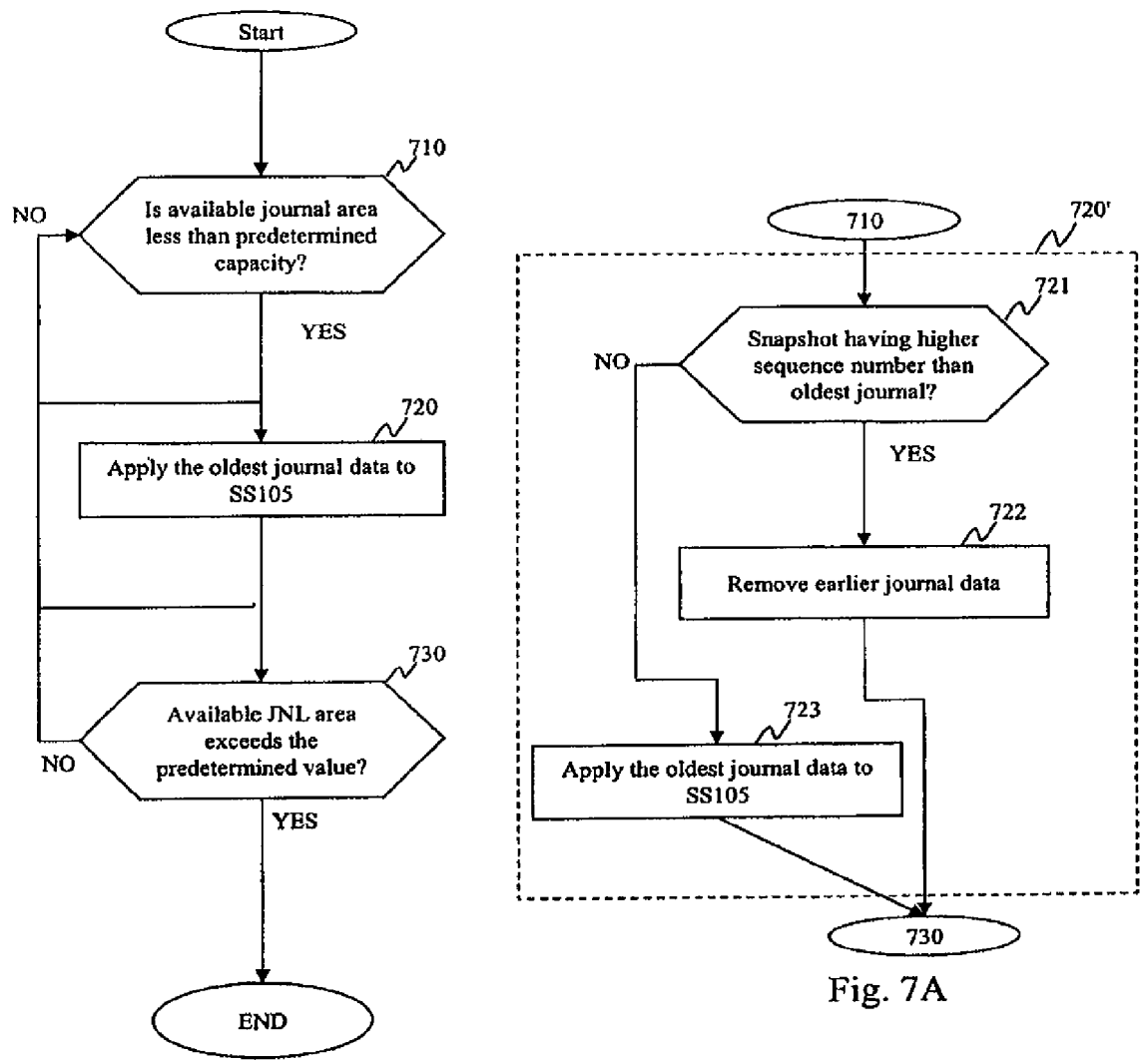
Fig. 7 Overflowing JNL

The present application is a Continuation application of U.S. application Ser. No. 12/473,415, filed May 28, 2009, which is a Continuation application of U.S. application Ser. No. 11/365,085, filed Feb. 28, 2006 (now U.S. Pat. No. 7,555, 505), which is a Continuation application of U.S. application Ser. No. 10/627,507, filed Jul. 25, 2003 (abandoned), the entire disclosures of all of the above-identified applications are hereby incorporated by reference.

This application is related to the following commonly owned and co-pending U.S. applications:

"Method and Apparatus for Data Recovery Using Storage Based Journaling," U.S. patent application Ser. No. 10/608,391, filed Jun. 26, 2003, and "Method and Apparatus for Data Recovery Using Storage Based Journaling," U.S. patent application Ser. No. 10/621,791, filed Jul. 16, 2003, both of which are herein incorporated by reference for all purposes.

BACKGROUND OF THE INVENTION

The present invention is related to computer storage and in particular to the recovery of data.

Several methods are conventionally used to prevent the loss of data. Typically, data is backed up in a periodic manner (e.g., once a day) by a system administrator. Many systems are commercially available which provide backup and recovery of data; e.g., Veritas Net Backup, Legato/Networker, and so on. Another technique is known as volume shadowing. This technique produces a mirror image of data onto a secondary storage system as it is being written to the primary storage system.

Journaling is a backup and restore technique commonly used in database systems. An image of the data to be backed up is taken. Then, as changes are made to the data, a journal of the changes is maintained. Recovery of data is accomplished by applying the journal to an appropriate image to recover data at any point in time. Typical database systems, such as Oracle, can perform journaling.

Except for database systems, however, there are no ways to recover data at any point in time. Even for database systems, applying a journal takes time since the procedure includes:
 reading the journal data from storage (e.g., disk)
 the journal must be analyzed to determine at where in the journal the desired data can be found
 apply the journal data to a suitable image of the data to reproduce the activities performed on the data—this usually involves accessing the image, and writing out data as the journal is applied Recovering data at any point in time addresses the following types of administrative requirements. For example, a typical request might be, "I deleted a file by mistake at around 10:00 am yesterday. I have to recover the file just before it was deleted."

If the data is not in a database system, this kind of request cannot be conveniently, if at all, serviced. A need therefore exists for processing data in a manner that facilitates recovery of lost data. A need exists for being able to provide data processing that facilitates data recovery in user environments other than in a database application.

SUMMARY OF THE INVENTION

In accordance with an aspect of the present invention, a storage system exposes an application programmer's interface (API) for applications program running on a host. The API allows execution of program code to create marker journal entries. The API also provides for retrieval of marker journals, and recovery operations. Another aspect of the invention, is the monitoring of operations being performed on a data store and the creation of marker journal entries upon detection one or more predetermined operations. Still another aspect of the invention is the retrieval of marker journal entries to facilitate recovery of a desired data state.

BRIEF DESCRIPTION OF THE DRAWINGS

Aspects, advantages and novel features of the present invention will become apparent from the following description of the invention presented in conjunction with the accompanying drawings:

FIG. 1 is a high level generalized block diagram of an illustrative embodiment of the present invention;

FIG. 2 is a generalized illustration of a illustrative embodiment of a data structure for storing journal entries in accordance with the present invention;

FIG. 3 is a generalized illustration of an illustrative embodiment of a data structure for managing the snapshot volumes and the journal entry volumes in accordance with the present invention;

FIG. 4 is a high level flow diagram highlighting the processing between the recovery manager and the controller in the storage system;

FIG. 5 illustrates the relationship between a snapshot and a plurality of journal entries;

FIG. 5A illustrates the relationship among a plurality of snapshots and a plurality of journal entries;

FIG. 6 is a high level illustration of the data flow when an overflow condition arises;

FIG. 7 is a high level flow chart highlighting an aspect of the controller in the storage system to handle an overflow condition;

FIG. 7A illustrates an alternative to a processing step shown in FIG. 7;

DESCRIPTION OF THE SPECIFIC EMBODIMENTS

Figure 8:
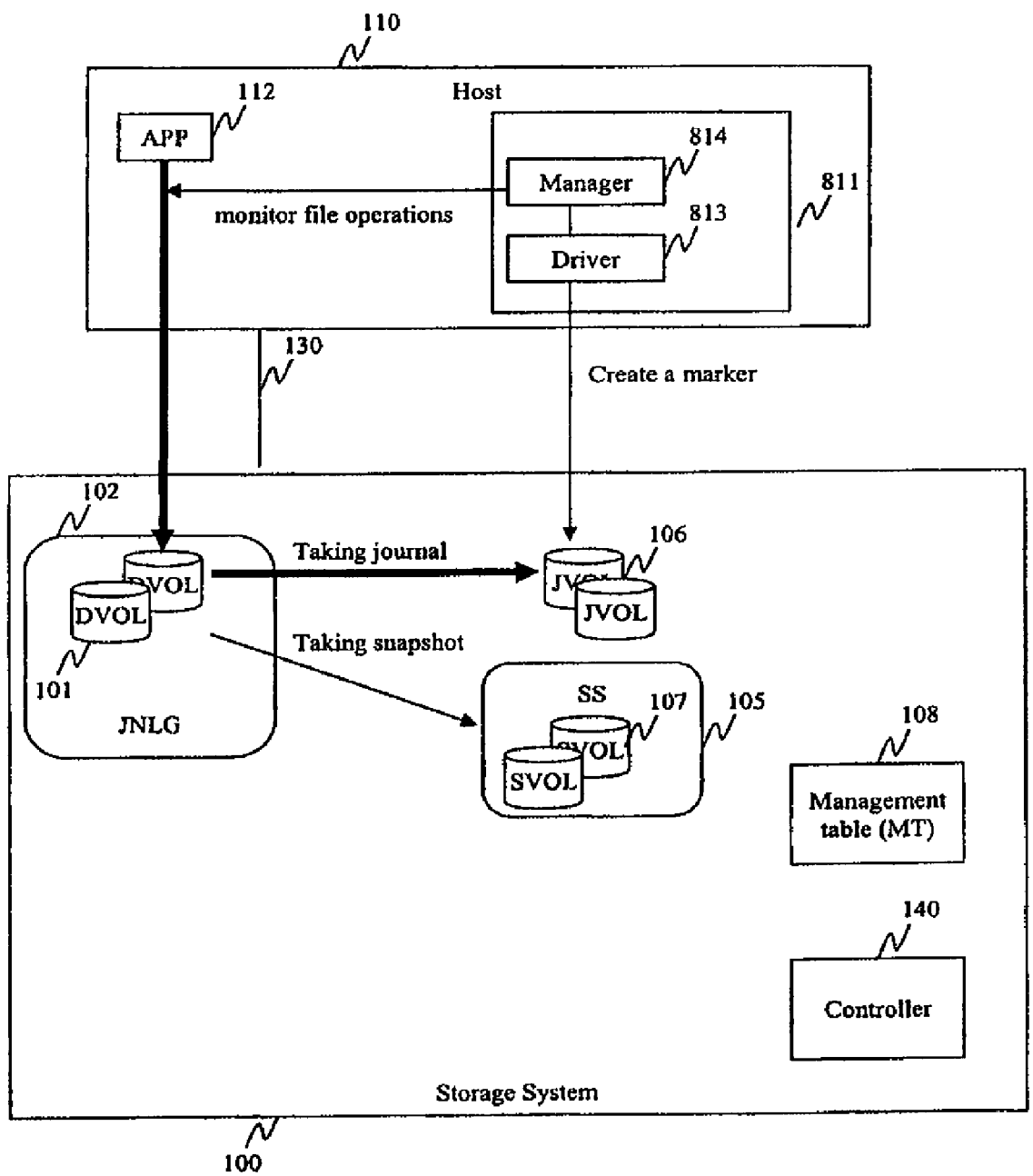
FIG. 8 illustrates the use of marker journal entries.

FIG. 1 is a high level generalized block diagram of an illustrative embodiment of a backup and recovery system according to the present invention. When the system is activated, a snapshot is taken for production data volumes (DVOL) 101. The term "snapshot" in this context conventionally refers to a data image of at the data volume at a given point in time. Depending on system requirements, implementation, and so on, the snapshot can be of the entire data volume, or some portion or portions of the data volume(s).

During the normal course of operation of the system in accordance with the invention, a journal entry is made for every write operation issued from the host to the data volumes. As will be discussed below, by applying a series of journal entries to an appropriate snapshot, data can be recovered at any point in time.

The backup and recovery system shown in FIG. 1 includes at least one storage system 100. Though not shown, one of ordinary skill can appreciate that the storage system includes suitable processor(s), memory, and control circuitry to perform IO between a host 110 and its storage media (e.g., disks). The backup and recovery system also requires at least one host 110. A suitable communication path 130 is provided between the host and the storage system.

The host 110 typically will have one or more user applications (APP) 112 executing on it. These applications will read and/or write data to storage media contained in the data volumes 101 of storage system 100. Thus, applications 112 and the data volumes 101 represent the target resources to be protected. It can be appreciated that data used by the user applications can be stored in one or more data volumes.

In accordance with the invention, a journal group (JNLG) 102 is defined. The data volumes 101 are organized into the journal group. In accordance with the present invention, a journal group is the smallest unit of data volumes where journaling of the write operations from the host 110 to the data volumes is guaranteed. The associated journal records the order of write operations from the host to the data volumes in proper sequence. The journal data produced by the journaling activity can be stored in one or more journal volumes (JVOL) 106.

The host 110 also includes a recovery manager (RM) 111. This component provides a high level coordination of the backup and recovery operations. Additional discussion about the recovery manager will be discussed below.

The storage system 100 provides a snapshot (SS) 105 of the data volumes comprising a journal group. For example, the snapshot 105 is representative of the data volumes 101 in the journal group 106 at the point in time that the snapshot was taken. Conventional methods are known for producing the snapshot image. One or more snapshot volumes (SVOL) 107 are provided in the storage system which contain the snapshot data. A snapshot can be contained in one or more snapshot volumes. Though the disclosed embodiment illustrates separate storage components for the journal data and the snapshot data, it can be appreciated that other implementations can provide a single storage component for storing the journal data and the snapshot data.

A management table (MT) 108 is provided to store the information relating to the journal group 102, the snapshot 105, and the journal volume(s) 106. FIG. 3 and the accompanying discussion below reveal additional detail about the management table.

A controller component 140 is also provided which coordinates the journaling of write operations and snapshots of the data volumes, and the corresponding movement of data among the different storage components 101, 106, 107. It can be appreciated that the controller component is a logical representation of a physical implementation which may comprise one or more sub-components distributed within the storage system 100.

FIG. 2 shows the data used in an implementation of the journal. When a write request from the host 110 arrives at the storage system 100, a journal is generated in response. The journal comprises a Journal Header 219 and Journal Data 225. The Journal Header 219 contains information about its corresponding Journal Data 225. The Journal Data 225 comprises the data (write data) that is the subject of the write operation.

The Journal Header 219 comprises an offset number (JH_OFS) 211. The offset number identifies a particular data volume 101 in the journal group 102. In this particular implementation, the data volumes are ordered as the $0^{th}$ data volume, the $1^{st}$ data volume, the $2^{nd}$ data volume and so on. The offset numbers might be 0, 1, 2, etc.

A starting address in the data volume (identified by the offset number 211) to which the write data is to be written is stored to a field in the Journal Header 219 to contain an address (JH_ADR) 212. For example, the address can be represented as a block number (LBA, Logical Block Address).

A field in the Journal Header 219 stores a data length (JH_LEN) 213, which represents the data length of the write data. Typically it is represented as a number of blocks.

A field in the Journal Header 219 stores the write time (JH_TIME) 214, which represents the time when the write request arrives at the storage system 100. The write time can include the calendar date, hours, minutes, seconds and even milliseconds. This time can be provided by the disk controller 140 or by the host 110. For example, in a mainframe computing environment, two or more mainframe hosts share a timer and can provide the time when a write command is issued.

A sequence number (JH_SEQ) 215 is assigned to each write request. The sequence number is stored in a field in the Journal Header 219. Every sequence number within a given journal group 102 is unique. The sequence number is assigned to a journal entry when it is created.

A journal volume identifier (J_JVOL) 216 is also stored in the Journal Header 219. The volume identifier identifies the journal volume 106 associated with the Journal Data 225. The identifier is indicative of the journal volume containing the Journal Data. It is noted that the Journal Data can be stored in a journal volume that is different from the journal volume which contains the Journal Header.

A journal data address (JH_JADR) 217 stored in the Journal Header 219 contains the beginning address of the Journal Data 225 in the associated journal volume 106 that contains the Journal Data.

FIG. 2 shows that the journal volume 106 comprises two data areas: a Journal Header Area 210 and a Journal Data Area 220. The Journal Header Area 210 contains only Journal Headers 219, and Journal Data Area 220 contains only Journal Data 225. The Journal Header is a fixed size data structure. A Journal Header is allocated sequentially from the beginning of the Journal Header Area. This sequential organization corresponds to the chronological order of the journal entries. As will be discussed, data is provided that points to the first journal entry in the list, which represents the "oldest" journal entry. It is typically necessary to find the Journal Header 219 for a given sequence number (as stored in the sequence number field 215) or for a given write time (as stored in the time field 214).

A journal type field (JH_TYPE) 218 identifies the type of journal entry. The value contained in this field indicates a type of MARKER or INTERNAL. If the type is MARKER, then the journal is a marker journal. The purpose of a MARKER type of journal will be discussed below. If the type is INTERNAL, then the journal records the data that is the subject of the write operation issued from the host 110.

Journal Header 219 and Journal Data 225 are contained in chronological order in their respective areas in the journal volume 106. Thus, the order in which the Journal Header and the Journal Data are stored in the journal volume is the same order as the assigned sequence number. As will be discussed below, an aspect of the present invention is that the journal information 219, 225 wrap within their respective areas 210, 220.

FIG. 3 shows detail about the management table 108 (FIG. 1). In order to manage the Journal Header Area 210 and Journal Data Area 220, pointers for each area are needed. As mentioned above, the management table maintains configuration information about a journal group 102 and the relationship between the journal group and its associated journal volume(s) 106 and snapshot image 105.

The management table 300 shown in FIG. 3 illustrates an example management table and its contents. The management table stores a journal group ID (GRID) 310 which identifies a particular journal group 102 in a storage system 100. A journal group name (GRNAME) 311 can also be provided to identify the journal group with a human recognizable identifier.

A journal attribute (GRATTR) 312 is associated with the journal group 102. In accordance with this particular implementation, two attributes are defined: MASTER and RESTORE. The MASTER attribute indicates the journal group is being journaled. The RESTORE attribute indicates that the journal group is being restored from a journal.

A journal status (GRSTS) 315 is associated with the journal group 102. There are two statuses: ACTIVE and INACTIVE.

The management table includes a field to hold a sequence counter (SEQ) 313. This counter serves as the source of sequence numbers used in the Journal Header 219. When creating a new journal, the sequence number 313 is read and assigned to the new journal. Then, the sequence number is incremented and written back into the management table.

The number (NUM_DVOL) 314 of data volumes 101 contained in a give journal group 102 is stored in the management table.

A data volume list (DVOL_LIST) 320 lists the data volumes in a journal group. In a particular implementation, DVOL_LIST is a pointer to the first entry of a data structure which holds the data volume information. This can be seen in FIG. 3. Each data volume information comprises an offset number (DVOL_OFFS) 321. For example, if the journal group 102 comprises three data volumes, the offset values could be 0, 1 and 2. A data volume identifier (DVOL_ID) 322 uniquely identifies a data volume within the entire storage system 100. A pointer (DVOL_NEXT) 324 points to the data structure holding information for the next data volume in the journal group; it is a NULL value otherwise.

The management table includes a field to store the number of journal volumes (NUM_JVOL) 330 that are being used to contain the data (journal header and journal data) associated with a journal group 102.

As described in FIG. 2, the Journal Header Area 210 contains the Journal Headers 219 for each journal; likewise for the Journal Data components 225. As mentioned above, an aspect of the invention is that the data areas 210, 220 wrap. This allows for journaling to continue despite the fact that there is limited space in each data area.

The management table includes fields to store pointers to different parts of the data areas 210, 220 to facilitate wrapping. Fields are provided to identify where the next journal entry is to be stored. A field (JI_HEAD_VOL) 331 identifies the journal volume 106 that contains the Journal Header Area 210 which will store the next new Journal Header 219. A field (JI_HEAD_ADR) 332 identifies an address on the journal volume of the location in the Journal Header Area where the next Journal Header will be stored. The journal volume that contains the Journal Data Area 220 into which the journal data will be stored is identified by information in a field (JI_DATA_VOL) 335. A field (JI_DATA_ADR) 336 identifies the specific address in the Journal Data Area where the data will be stored. Thus, the next journal entry to be written is "pointed" to by the information contained in the "JI_" fields 331, 332, 335, 336.

The management table also includes fields which identify the "oldest" journal entry. The use of this information will be described below. A field (JO_HEAD_VOL) 333 identifies the journal volume which stores the Journal Header Area 210 that contains the oldest Journal Header 219. A field (JO_HEAD_ADR) 334 identifies the address within the Journal Header Area of the location of the journal header of the oldest journal. A field (JO_DATA_VOL) 337 identifies the journal volume which stores the Journal Data Area 220 that contains the data of the oldest journal. The location of the data in the Journal Data Area is stored in a field (JO_DATA_ADR) 338.

The management table includes a list of journal volumes (JVOL_LIST) 340 associated with a particular journal group 102. In a particular implementation, JVOL_LIST is a pointer to a data structure of information for journal volumes. As can be seen in FIG. 3, each data structure comprises an offset number (JVOL_OFS) 341 which identifies a particular journal volume 106 associated with a given journal group 102. For example, if a journal group is associated with two journal volumes 106, then each journal volume might be identified by a 0 or a 1. A journal volume identifier (JVOL_ID) 342 uniquely identifies the journal volume within the storage system 100. Finally, a pointer (JVOL_NEXT) 344 points to the next data structure entry pertaining to the next journal volume associated with the journal group; it is a NULL value otherwise.

The management table includes a list (SS_LIST) 350 of snapshot images 105 associated with a given journal group 102. In this particular implementation, SS_LIST is a pointer to snapshot information data structures, as indicated in FIG. 3. Each snapshot information data structure includes a sequence number (SS_SEQ) 351 that is assigned when the snapshot is taken. As discussed above, the number comes from the sequence counter 313. A time value (SS_TIME) 352 indicates the time when the snapshot was taken. A status (SS_STS) 358 is associated with each snapshot; valid values include VALID and INVALID. A pointer (SS_NEXT) 353 points to the next snapshot information data structure; it is a NULL value otherwise.

Each snapshot information data structure also includes a list of snapshot volumes 107 (FIG. 1) used to store the snapshot images 105. As can be seen in FIG. 3, a pointer (SVOL_LIST) 354 to a snapshot volume information data structure is stored in each snapshot information data structure. Each snapshot volume information data structure includes an offset number (SVOL_OFFS) 355 which identifies a snapshot volume that contains at least a portion of the snapshot image. It is possible that a snapshot image will be segmented or otherwise partitioned and stored in more than one snapshot volume. In this particular implementation, the offset identifies the $i^{th}$ snapshot volume which contains a portion (segment, partition, etc) of the snapshot image. In one implementation, the $i^{th}$ segment of the snapshot image might be stored in the $i^{th}$ snapshot volume. Each snapshot volume information data structure further includes a snapshot volume identifier (SVOL_ID) 356 that uniquely identifies the snapshot volume in the storage system 100. A pointer (SVOL_NEXT) 357 points to the next snapshot volume information data structure for a given snapshot image.

FIG. 4 shows a flowchart highlighting the processing performed by the recovery manager 111 and Storage System 100 to initiate backup processing in accordance with the illustrative embodiment of the invention as shown in the figures. If journal entries are not recorded during the taking of a snapshot, the write operations corresponding to those journal entries would be lost and data corruption could occur during a data restoration operation. Thus, in accordance with an aspect of the invention, the journaling process is started prior to taking the first snapshot. Doing this ensures that any write operations which occur during the taking of a snapshot are journaled. As a note, any journal entries recorded prior to the completion of the snapshot can be ignored.

Further in accordance with the invention, a single sequence of numbers (SEQ) 313 are associated with each of one or more snapshots and journal entries, as they are created. The purpose of associating the same sequence of numbers to both the snapshots and the journal entries will be discussed below.

Continuing with FIG. 4, the recovery manager 111 might define, in a step 410, a journal group (JNLG) 102 if one has not already been defined. As indicated in FIG. 1, this may include identifying one or data volumes (DVOL) 101 for which journaling is performed, and identifying one or journal volumes (JVOL) 106 which are used to store the journal-related information. The recovery manager performs a suitable sequence of interactions with the storage system 100 to accomplish this. In a step 415, the storage system may create a management table 108 (FIG. 1), incorporating the various information shown in the table detail 300 illustrated in FIG. 3. Among other things, the process includes initializing the JVOL_LIST 340 to list the journal volumes which comprise the journal group 102 Likewise, the list of data volumes DVOL_LIST 320 is created. The fields which identify the next journal entry (or in this case where the table is first created, the first journal entry) are initialized. Thus, JI_HEAD_VOL 331 might identify the first in the list of journal volumes and JI_HEAD_ADR 332 might point to the first entry in the Journal Header Area 210 located in the first journal volume. Likewise, JI_DATA_VOL 335 might identify the first in the list of journal volumes and JI_DATA_ADR 336 might point to the beginning of the Journal Data Area 220 in the first journal volume. Note, that the header and the data areas 210, 220 may reside on different journal volumes, so JI_DATA_VOL might identify a journal volume different from the first journal volume.

In a step 420, the recovery manager 111 will initiate the journaling process. Suitable communication(s) are made to the storage system 100 to perform journaling. In a step 425, the storage system will make a journal entry for each write operation that issues from the host 110.

With reference to FIG. 3, making a journal entry includes, among other things, identifying the location for the next journal entry. The fields JI_HEAD_VOL 331 and JI_HEAD_ADR 332 identify the journal volume 106 and the location in the Journal Header Area 210 of the next Journal Header 219. The sequence counter (SEQ) 313 from the management table is copied to (associated with) the JH_SEQ 215 field of the next header. The sequence counter is then incremented and stored back to the management table. Of course, the sequence counter can be incremented first, copied to JH_SEQ, and then stored back to the management table.

The fields JI_DATA_VOL 335 and in the management table identify the journal volume and the beginning of the Journal Data Area 220 for storing the data associated with the write operation. The JI_DATA_VOL and JI_DATA_ADR fields are copied to JH_JVOL 216 and to JH_ADR 212, respectively, of the Journal Header, thus providing the Journal Header with a pointer to its corresponding Journal Data. The data of the write operation is stored.

The JI_HEAD_VOL 331 and JI_HEAD_ADR 332 fields are updated to point to the next Journal Header 219 for the next journal entry. This involves taking the next contiguous Journal Header entry in the Journal Header Area 210. Likewise, the JI_DATA_ADR field (and perhaps JI_DATA_VOL field) is updated to reflect the beginning of the Journal Data Area for the next journal entry. This involves advancing to the next available location in the Journal Data Area. These fields therefore can be viewed as pointing to a list of journal entries. Journal entries in the list are linked together by virtue of the sequential organization of the Journal Headers 219 in the Journal Header Area 210.

When the end of the Journal Header Area 210 is reached, the Journal Header 219 for the next journal entry wraps to the beginning of the Journal Header Area. Similarly for the Journal Data 225. To prevent overwriting earlier journal entries, the present invention provides for a procedure to free up entries in the journal volume 106. This aspect of the invention is discussed below.

For the very first journal entry, the JO_HEAD_VOL field 333, JO_HEAD_ADR field 334, JO_DATA_VOL field 337, and the JO_DATA_ADR field 338 are set to contain their contents of their corresponding "JI_" fields. As will be explained the "JO_" fields point to the oldest journal entry. Thus, as new journal entries are made, the "JO_" fields do not advance while the "JI_" fields do advance. Update of the "JO_" fields is discussed below.

Continuing with the flowchart of FIG. 4, when the journaling process has been initiated, all write operations issuing from the host are journaled. Then in a step 430, the recovery manager 111 will initiate taking a snapshot of the data volumes 101. The storage system 100 receives an indication from the recovery manager to take a snapshot. In a step 435, the storage system performs the process of taking a snapshot of the data volumes. Among other things, this includes accessing SS_LIST 350 from the management table (FIG. 3). A suitable amount of memory is allocated for fields 351-354 to represent the next snapshot. The sequence counter (SEQ) 313 is copied to the field SS_SEQ 351 and incremented, in the manner discussed above for JH_SEQ 215. Thus, over time, a sequence of numbers is produced from SEQ 313, each number in the sequence being assigned either to a journal entry or a snapshot entry.

The snapshot is stored in one (or more) snapshot volumes (SVOL) 107. A suitable amount of memory is allocated for fields 355-357. The information relating to the SVOLs for storing the snapshot are then stored into the fields 355-357. If additional volumes are required to store the snapshot, then additional memory is allocated for fields 355-357.

FIG. 5 illustrates the relationship between journal entries and snapshots. The snapshot 520 represents the first snapshot image of the data volumes 101 belonging to a journal group 102. Note that journal entries (510) having sequence numbers SEQ0 and SEQ1 have been made, and represent journal entries for two write operations. These entries show that journaling has been initiated at a time prior to the snapshot being taken (step 420). Thus, at a time corresponding to the sequence number SEQ2, the recovery manager 111 initiates the taking of a snapshot, and since journaling has been initiated, any write operations occurring during the taking of the snapshot are journaled. Thus, the write operations 500 associated with the sequence numbers SEQ3 and higher show that those operations are being journaled. As an observation, the journal entries identified by sequence numbers SEQ0 and SEQ1 can be discarded or otherwise ignored.

Recovering data typically requires recover the data state of at least a portion of the data volumes 101 at a specific time. Generally, this is accomplished by applying one or more journal entries to a snapshot that was taken earlier in time relative to the journal entries. In the disclosed illustrative embodiment, the sequence number SEQ 313 is incremented each time it is assigned to a journal entry or to a snapshot. Therefore, it is a simple matter to identify which journal entries can be applied to a selected snapshot; i.e., those journal entries whose associated sequence numbers (JH_SEQ, 215) are greater than the sequence number (SS_SEQ, 351) associated with the selected snapshot.

For example, the administrator may specify some point in time, presumably a time that is earlier than the time (the "target time") at which the data in the data volume was lost or otherwise corrupted. The time field SS_TIME 352 for each snapshot is searched until a time earlier than the target time is found. Next, the Journal Headers 219 in the Journal Header Area 210 is searched, beginning from the "oldest" Journal Header. The oldest Journal Header can be identified by the "JO_" fields 333, 334, 337, and 338 in the management table. The Journal Headers are searched sequentially in the area 210 for the first header whose sequence number JH_SEQ 215 is greater than the sequence number SS_SEQ 351 associated with the selected snapshot. The selected snapshot is incrementally updated by applying each journal entry, one at a time, to the snapshot in sequential order, thus reproducing the sequence of write operations. This continues as long as the time field JH_TIME 214 of the journal entry is prior to the target time. The update ceases with the first journal entry whose time field 214 is past the target time.

In accordance with one aspect of the invention, a single snapshot is taken. All journal entries subsequent to that snapshot can then be applied to reconstruct the data state at a given time. In accordance with another aspect of the present invention, multiple snapshots can be taken. This is shown in FIG. 5A where multiple snapshots 520' are taken. In accordance with the invention, each snapshot and journal entry is assigned a sequence number in the order in which the object (snapshot or journal entry) is recorded. It can be appreciated that there typically will be many journal entries 510 recorded between each snapshot 520'. Having multiple snapshots allows for quicker recovery time for restoring data. The snapshot closest in time to the target recovery time would be selected. The journal entries made subsequent to the snapshot could then be applied to restore the desired data state.

FIG. 6 illustrates another aspect of the present invention. In accordance with the invention, a journal entry is made for every write operation issued from the host; this can result in a rather large number of journal entries. As time passes and journal entries accumulate, the one or more journal volumes 106 defined by the recovery manager 111 for a journal group 102 will eventually fill up. At that time no more journal entries can be made. As a consequence, subsequent write operations would not be journaled and recovery of the data state subsequent to the time the journal volumes become filled would not be possible.

FIG. 6 shows that the storage system 100 will apply journal entries to a suitable snapshot in response to detection of an "overflow" condition. An "overflow" is deemed to exist when the available space in the journal volume(s) falls below some predetermined threshold. It can be appreciated that many criteria can be used to determine if an overflow condition exists. A straightforward threshold is based on the total storage capacity of the journal volume(s) assigned for a journal group. When the free space becomes some percentage (say, 10%) of the total storage capacity, then an overflow condition exists. Another threshold might be used for each journal volume. In an aspect of the invention, the free space capacity in the journal volume(s) is periodically monitored. Alternatively, the free space can be monitored in an aperiodic manner. For example, the intervals between monitoring can be randomly spaced. As another example, the monitoring intervals can be spaced apart depending on the level of free space; i.e., the monitoring interval can vary as a function of the free space level.

FIG. 7 highlights the processing which takes place in the storage system 100 to detect an overflow condition. Thus, in a step, 710, the storage system periodically checks the total free space of the journal volume(s) 106; e.g., every ten seconds. The free space can easily be calculated since the pointers (e.g., JI_CTL_VOL 331, JI_CTL_ADDR 332) in the management table 300 maintain the current state of the storage consumed by the journal volumes. If the free space is above the threshold, then the monitoring process simply waits for a period of time to pass and then repeats its check of the journal volume free space.

If the free space falls below a predetermined threshold, then in a step 720 some of the journal entries are applied to a snapshot to update the snapshot. In particular, the oldest journal entry(ies) are applied to the snapshot.

Referring to FIG. 3, the Journal Header 219 of the "oldest" journal entry is identified by the JO_HEAD_VOL field 333 and the JO_HEAD_ADR field 334. These fields identify the journal volume and the location in the journal volume of the Journal Header Area 210 of the oldest journal entry. Likewise, the Journal Data of the oldest journal entry is identified by the JO_DATA_VOL field 337 and the JO_DATA_ADR field 338. The journal entry identified by these fields is applied to a snapshot. The snapshot that is selected is the snapshot having an associated sequence number closest to the sequence number of the journal entry and earlier in time than the journal entry. Thus, in this particular implementation where the sequence number is incremented each time, the snapshot having the sequence number closest to but less than the sequence number of the journal entry is selected (i.e., "earlier in time). When the snapshot is updated by applying the journal entry to it, the applied journal entry is freed. This can simply involve updating the JO_HEAD_VOL field 333, JO_HEAD_ADR field 334, JO_DATA_VOL field 337, and the JO_DATA_ADR field 338 to the next journal entry.

As an observation, it can be appreciated by those of ordinary skill, that the sequence numbers will eventually wrap, and start counting from zero again. It is well within the level of ordinary skill to provide a suitable mechanism for keeping track of this when comparing sequence numbers.

Continuing with FIG. 7, after applying the journal entry to the snapshot to update the snapshot, a check is made of the increase in the journal volume free space as a result of the applied journal entry being freed up (step 730). The free space can be compared against the threshold criterion used in step 710. Alternatively, a different threshold can be used. For example, here a higher amount of free space may be required to terminate this process than was used to initiate the process. This avoids invoking the process too frequently, but once invoked the second higher threshold encourages recovering as much free space as is reasonable. It can be appreciated that these thresholds can be determined empirically over time by an administrator.

Thus, in step 730, if the threshold for stopping the process is met (i.e., free space exceeds threshold), then the process stops. Otherwise, step 720 is repeated for the next oldest journal entry. Steps 730 and 720 are repeated until the free space level meets the threshold criterion used in step 730.

FIG. 7A highlights sub-steps for an alternative embodiment to step 720 shown in FIG. 7. Step 720 frees up a journal entry by applying it to the latest snapshot that is not later in time than the journal entry. However, where multiple snapshots are available, it may be possible to avoid the time consuming process of applying the journal entry to a snapshot in order to update the snapshot.

FIG. 7A shows details for a step 720' that is an alternate to step 720 of FIG. 7. At a step 721, a determination is made whether a snapshot exists that is later in time than the oldest journal entry. This determination can be made by searching for the first snapshot whose associated sequence number is greater than that of the oldest journal entry. Alternatively, this determination can be made by looking for a snapshot that is a predetermined amount of time later than the oldest journal entry can be selected; for example, the criterion may be that the snapshot must be at least one hour later in time than the oldest journal entry. Still another alternate is to use the sequence numbers associated with the snapshots and the journal entries, rather than time. For example, the criterion might be to select a snapshot whose sequence number is N increments away from the sequence number of the oldest journal entry.

If such a snapshot can be found in step 721, then the earlier journal entries can be removed without having to apply them to a snapshot. Thus, in a step 722, the "JO_" fields (JO_HEAD_VOL 333, JO_HEAD_ADR 334, JO_DATA_VOL 337, and JO_DATA_ADR 338) are simply moved to a point in the list of journal entries that is later in time than the selected snapshot. If no such snapshot can be found, then in a step 723 the oldest journal entry is applied to a snapshot that is earlier in time than the oldest journal entry, as discussed for step 720.

Still another alternative for step 721 is simply to select the most recent snapshot. All the journal entries whose sequence numbers are less than that of the most recent snapshot can be freed. Again, this simply involves updating the "JO_" fields so they point to the first journal entry whose sequence number is greater than that of the most recent snapshot. Recall that an aspect of the invention is being able to recover the data state for any desired point in time. This can be accomplished by storing as many journal entries as possible and then applying the journal entries to a snapshot to reproduce the write operations. This last embodiment has the potential effect of removing large numbers of journal entries, thus reducing the range of time within which the data state can be recovered. Nevertheless, for a particular configuration it may be desirable to remove large numbers of journal entries for a given operating environment.

Another aspect of the present invention is the ability to place a "marker" among the journal entries. In accordance with an illustrative embodiment of this aspect of the invention, an application programming interface (API) can be provided to manipulate these markers, referred to herein as marker journal entries, marker journals, etc. Marker journals can be created and inserted among the journal entries to note actions performed on the data volume (production volume) 101 or events in general (e.g., system boot up). Marker journals can be searched and used to identify previously marked actions and events. The API can be used by high-level (or user-level) applications. The API can include functions that are limited to system level processes.

FIG. 8 shows additional detail in the block diagram illustrated in FIG. 1. A Management Program (MP) 811 component comprises a Manager 814 and a Driver 813. The Driver component provides a set of API's to provide journaling functions implemented in storage system 100 in accordance with this aspect of the invention. The Manager component represents an example of an application program that uses the API's provided by the Driver component. As will be discussed below, user applications 112 can use parts of the API provided by the Driver. Following is a usage exemplar, illustrating the basic functionality provided by an API in accordance with the present invention.

The Manager component 814 can be configured to monitor operations on all or parts of a data volume (production data store) 101 such as a database, a directory, one or more files, or other objects of a the file system. A user can be provided with access to the Manager via a suitable interface; e.g., command line interface, GUI, etc. The user can interact with the Manager to specify objects and operations on those objects to be monitored. When the Manager detects a specified operation on the object, it calls an appropriate marker journal function via the API to create a marker journal to mark the event or action. Among other things, the marker journal can include information such as a filename, the detected operation, the name of the host 110, and a timestamp.

The Driver component 813 can interact with the storage system 100 accordingly to create the marker. In response, the storage system 100 creates the marker journal in the same manner as discussed above for journal entries associated with write operations. Referring for a moment to FIG. 2, the journal type field (JH_TYPE) 218 can be set to MARKER to indicate that journal entry is a marker journal. Journal entries associated with write operations would have a field value of INTERNAL. Any information that is associated with the marker journal entry can be stored in the journal data area of the journal entry.

Figure 9:
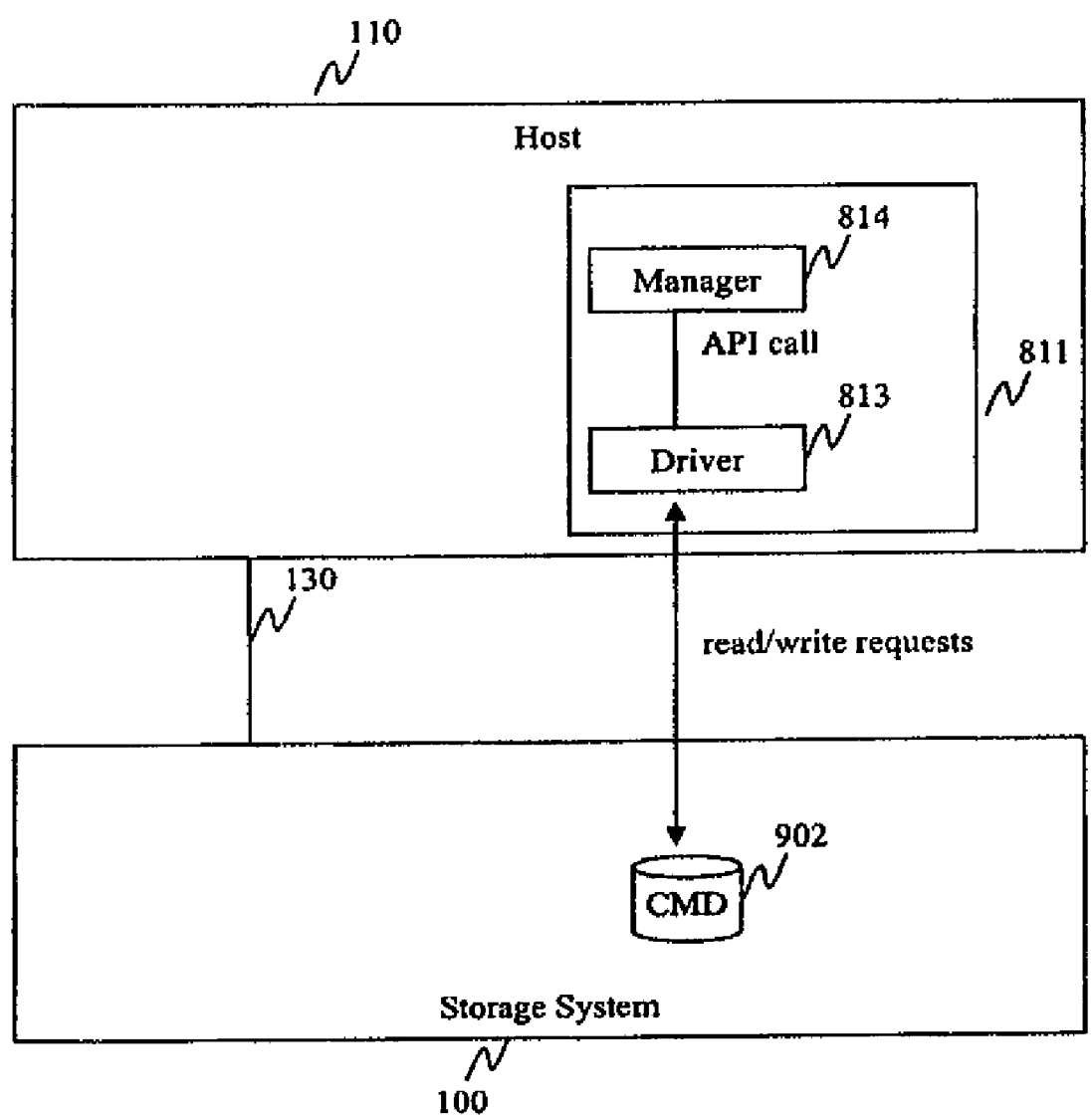
FIG. 9 shows a SCSI-based implementation of the embodiment shown in FIG. 8.

FIG. 9 illustrates an example for implementing an API based on a storage system 100 that implements the SCSI (small computer system interface) standard. A special device, referred to herein as a command device (CMD) 902, can be defined in the storage system 100. When the Driver component 813 issues a read request or a write request to the CMD device, the storage system 100 can intercept the request and treat it as a special command. For example, a write request to the CMD device can contain data (write data) that indicates a function relating to a marker journal such as creating a marker journal. Other functions will be discussed below. The write data can include marker information such as time range, filename, operation, and so on.

With a write command, the Manager component 814 can also specify to read special information from the storage system 100. In this case, the write command indicates information to be read, and following a read command to the CMD device 902 actually reads the information. Thus, for example, a pair of write and read requests to the CMD device can be used to retrieve a marker journal entry and the data associated with the marker journal.

An alternative implementation is to extend the SCSI command set. For example, the SCSI standard allows developers to extend the SCSI common command set (CCS) which describes the core set of commands supported by SCSI. Thus, special commands can be defined to provide the API functionality. From these implementation examples, one of ordinary skill in the relevant arts can readily appreciate that other implementations are possible.

Figure 10:
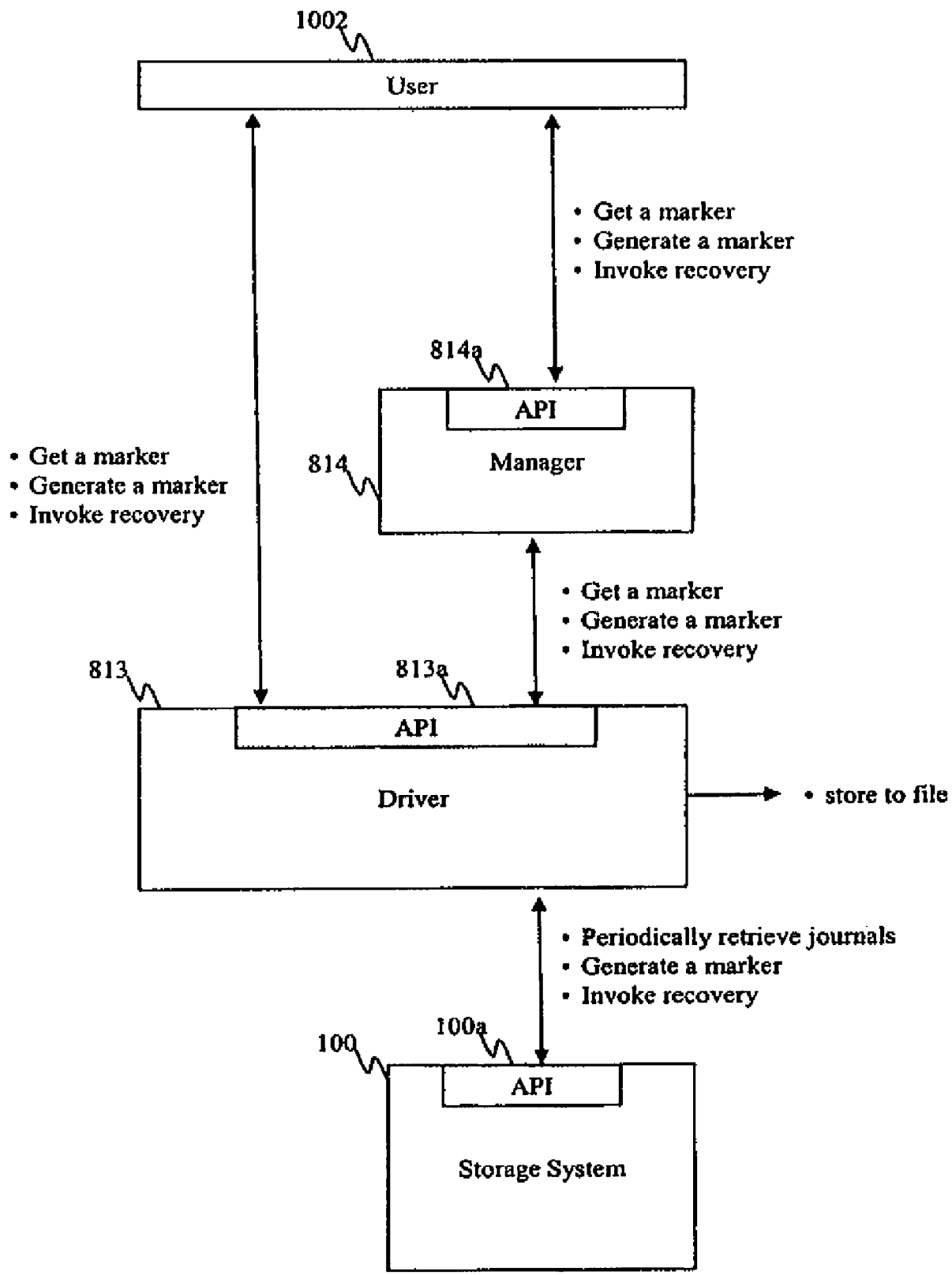
FIG. 10 shows a block diagram of the API's according to another aspect of the invention.

FIG. 10 illustrates the interaction among the components shown in FIG. 1. A user 1002 on the host 110 can interact via a suitable API with the Manager component 814 or directly with the Driver component 813 to manipulate marker journals. The user can be an application level user or a system administrator. The "user" can be a machine that is suitably interfaced to the Manager component and/or the Driver component.

The Manager component 814 can provide its own API 814a to the user 1002. The functions provided by this API can be similar to the marker journal functions provided by the API 813a of the Driver component 813. However, since the Manager component provides a higher level of functionality, its API is likely to include functions not needed for managing marker journals. It can be appreciated that in other embodiments of the invention, a single API can be defined which includes the functionality of API's 813a and 814a.

The Driver component 813 communicates with the storage system 100 to initiate the desired action. As illustrated in FIG. 10, typical actions include, among others, generating marker journals, periodically retrieving journal entries, and recovery using marker journals.

Following is a list of functions provided by the API's according to an embodiment of the present invention:

Generate Marker

This function will generate a marker journal entry. This function can be invoked by the user or by the Manager component 114 to generate a marker journal. The following information can be provided:
1. operation—this specifies a data operation that is being performed on the object; e.g., deletion, re-format, closing a file, renaming, etc. It is possible that no data operation is specified. The user may simply wish to create a marker journal to identify the data state of the data volume 101 at some point in time.
2. timestamp
3. object name, e.g., filename, volume name, a database identifier, etc.
4. hostname
5. host IP Address
6. comments The GENERATE MARKER request is sent through the Driver component 113 to the storage system 100. The storage system performs the following:
1. Assign the next number in the sequence number SEQ 313 to the marker. In addition, a time value can be placed in the JH_TIME 214 field, thus associating a time of creation with the marker journal.
2. Store the marker on the journal volume JVOL 106. The accompanying information is stored in the journal data area 225.

The created marker journal entry is now inserted, in timewise sequence, into the list of journal entries.

Get Marker

Retrieve one or more marker journal entries by specifying at least one or more of the following retrieval criteria:
1. time—This can be a range of times, or a single time value. If a single time value is provided, the marker journals prior to the time value or subsequent to the time value can be retrieved. Some convention would be required to specify whether prior-in-time marker journals are obtained, or subsequent-in-time marker journals are obtained; e.g., a "+" sign and a "−" sign can be used.
2. object name, e.g., filename, volume name, a database identifier, etc.
3. operation—A specific operation can be used to specify which marker journal(s) to obtain.

Generally, any of the data in the marker journal entry can be used as the retrieval criterion(a). For example, it may be desirable to allow a user to search the "comment" that is stored with the marker journal.

The following information from the retrieved marker journals can be obtained, although it is understood that any information associated with the marker journal can be obtained.
sequence number
timestamp
other information in journal data area 225

Read Header

The next two function allow a user to see makers stored to the journal volume JVOL 106 at any time. The Driver 813 searches markers that a user wants to see. In order to speed up the search, Driver 813 periodically reads journal headers 219, finds markers, reads journal data 225, and stores them to a file. This stores all the markers to a file in advance.

This function obtains the header portion of a marker journal entry.

A sequence number is provided to identify which journal header to read next. This is used to calculate the location of the first header.

The number of journal headers is provided to indicate how many journal headers are to be communicated to the driver 813.

Read Journal

This function reads the journal header.

A sequence number is provided to identify which journal header to read next. This is used to calculate the location of the first header.

The location and length of the journal data are obtained from the JH_JNL 216, JH_JADR 217 and JH_LEN 213 fields. This information determines how much data is in a given marker journal.

Invoke Recovery

This invokes a recovery action. A user can invoke recovery using the following parameters:
timestamp as the recovery target time, or
sequence number as the recovery target time.

Objects can be monitored for certain actions. For example, the Manager component 814 can be configured to monitor the data volume 101 for user-specified activity (data operations) to be performed on objects contained in the volume. The object can be the entire volume, a file system or portions of a file system. The object can include application objects such as files, database components, and so on. Activities include, among others, closing a file, removing an object, manipulation (creation, deletion, etc) of symbolic links to files and/or directories, formatting all or a portion of a volume, and so on.

A user can specify which actions to detect. When the Manager 814 detects a specified operation, the Manager can issue a GENERATE MARKER request to mark the event. Similarly, the user can specify an action or actions to be performed on an object or objects. When the Manager detects a specified action on a specified object, a GENERATE MARKER request can be issued to mark the occurrence of that event.

The user can also mark events that take place within the volume 101. For example, when the user shuts down the system, she might issue a SYNC command (in the case of a UNIX OS) to sync the file system and also invoke the GENERATE MARKER command to mark the event of syncing the file system. She might mark the event of booting up the system. It can be appreciated that the Manager component 114 can be configured to detect and automatically act on these events as well. It is observed that an event can be marked before or after the occurrence of the event. For example, the actions of deleting a file or SYNC'ing a file system probably are preferably performed prior to marking the action. If a major update of a data file or a database is about to be performed, it might be prudent to create a marker journal before proceeding; this can be referred to as "pre-marking" the event.

The foregoing mechanisms for manipulating marker journals can be used to facilitate recovery. For example, suppose a system administrator configures the Manager component 814 to mark every "delete" operation that is performed on "file" objects. Each time a user in the host 110 performs a file delete, a marker journal entry can be created (using the GENERATE MARKER command) and stored in the journal volume 106. This operation is a type where it might be desirable to "pre-mark" each such event; that is, a marker journal entry is created prior to carrying out the delete operation to mark a point in time just prior to the operation. Thus, over time, the journal entries contained in the journal volumes will be sprinkled with marker journal entries identifying points in time prior to each file deletion operation.

If a user later wishes to recover an inadvertently deleted file, the marker journals can be used to find a suitable recovery point. For example, the user is likely to know roughly when he deleted a file. A GET MARKER command that specifies a time prior to the estimated time of deletion and further specifying an operation of "delete" on objects of "file" with the name of the deleted file as an object can be issued to the storage system 100. The matching marker journal entry is then retrieved. This journal entry identifies a point in time prior to the delete operation, and can then serve as the recovery point for a subsequent recovery operation. As can be seen in FIG. 2, all journal entries, including marker journals, have a sequence number. Thus, the sequence number of the retrieved marker journal entry can be used to determine the latest journal entry just prior to the deletion action. A suitable snapshot is obtained and updated with journal entries of type INTERNAL, up to the latest journal entry. At that point, the data state of the volume reflects the time just before the file was deleted, thus allowing for the deleted file to be restored.

Figure 11:
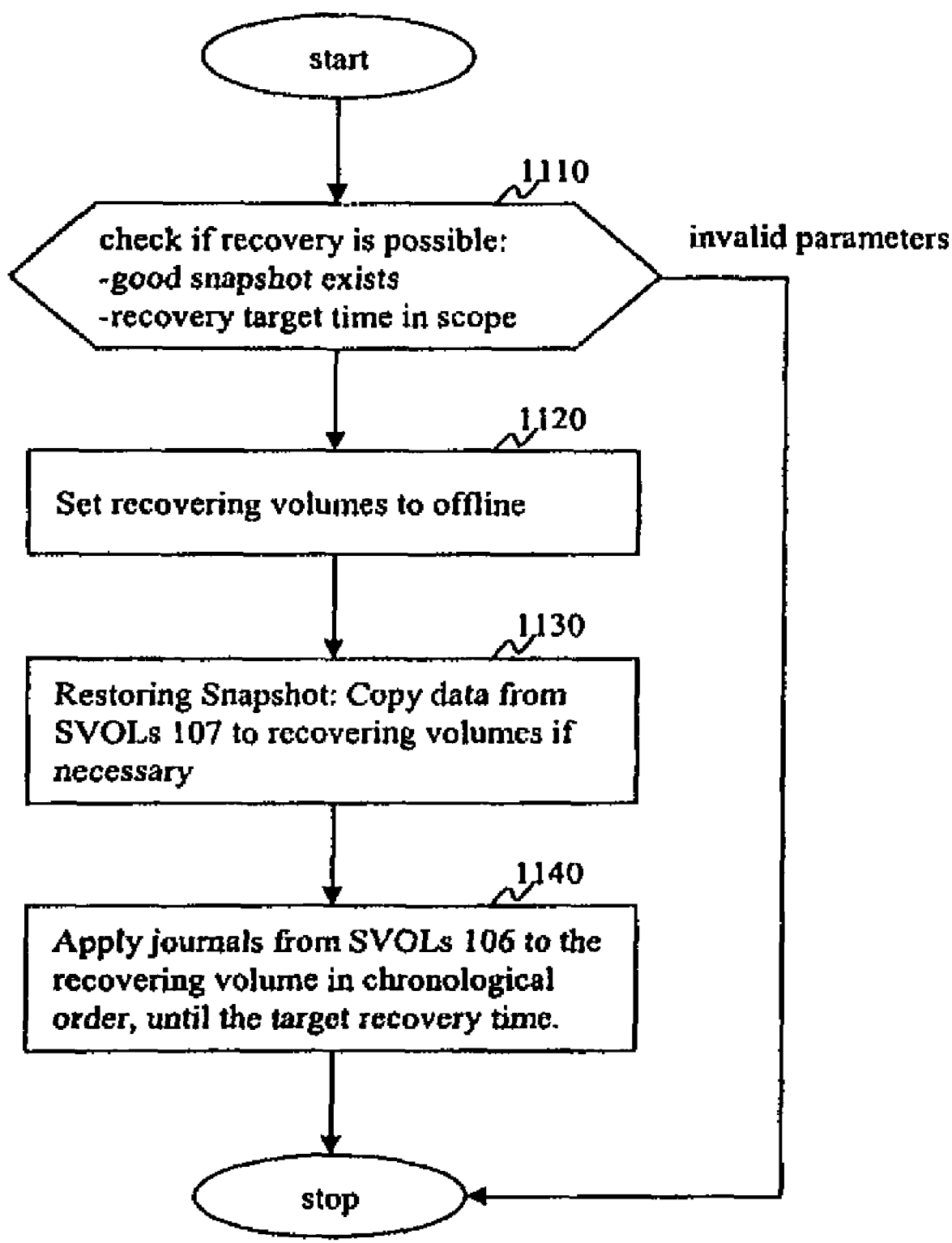
FIG. 11 is a flowchart highlighting the steps for a recovery operation.

FIG. 11 illustrates recovery processing according to an illustrative embodiment of the present invention. The storage system 100 determines in a step 1110 whether recovery is possible. A snapshot must have been taken between the oldest journal entry and latest journal entry. As discussed above, every snapshot has a sequence number taken from the same sequence of numbers used for the journal entries. The sequence number can be used to identify a suitable snapshot. If the sequence number of a candidate snapshot is greater than that of the oldest journal and smaller than that of the latest journal, then the snapshot is suitable.

Then in a step 1120, the recovery volume is set to an offline state. The term "recovery volume" is used in a generic sense to refer to one or more volumes on which the data recovery process is being performed. In the context of the present invention, "offline" is taken to mean that the user, and more generally the host device 110, cannot access the recovery volume. For example, in the case that the production volume is being used as the recovery volume, it is likely to be desirable that the host 110 be prevented at least from issuing write operations to the volume. Also, the host typically will not be permitted to perform read operations. Of course, the storage system itself has full access to the recovery volume in order to perform the recovery task.

In a step 1130, the snapshot is copied to the recovery volume in preparation for the recovery operation. The production volume itself can be the recovery volume. However, it can be appreciated that the recovery manager 111 can allow the user to specify a volume other than the production volume to serve as the target of the data recovery operation. For example, the recovery volume can be the volume on which the snapshot is stored. Using a volume other than the production volume to perform the recovery operation may be preferred where it is desirable to provide continued use of the production volume.

In a step 1140, one or more journal entries are applied to update the snapshot volume in the manner as discussed previously. Enough journal entries are applied to update the snapshot to a point in time just prior to the occurrence of the file deletion. At that point the recovery volume can be brought "online." In the context of the present invention, the "online" state is taken to mean that the host device 110 is given access to the recovery volume.

Referring again to FIG. 10, according to another aspect of the invention, periodic retrievals of marker journal entries can be made and stored locally in the host 110 using the GET MARKER command and specifying suitable criteria. For example, the Driver component 813 might periodically issue a GET MARKER for "delete" operations performed on "file" objects. Other retrieval criteria can be specified. Having a locally accessible copy of certain marker journals reduces delay in retrieving one marker journal at a time from the storage system 100. This can greatly speed up a search for a recovery point.

From the foregoing, it can be appreciated that the API definition can be readily extended to provide additional functionality. The disclosed embodiments typically can be provided using a combination of hardware and software implementations; e.g., combinations of software, firmware, and/or custom logic such as ASICs (application specific ICs) are possible. One of ordinary skill can readily appreciate that the underlying technical implementation will be determined based on factors including but not limited to or restricted to system cost, system performance, the existence of legacy software and legacy hardware, operating environment, and so on. The disclosed embodiments can be readily reduced to specific implementations without undue experimentation by those of ordinary skill in the relevant art.

What is claimed is:

1. A computer system to be coupled to a host computer via a network, the computer system comprising:
    a data volume storing write data from the host computer;
    a snapshot storing area storing a first snapshot of at least a portion of the data volume at a first point in time, and also storing a second snapshot of the portion of the data volume at a second point in time subsequent to the first point in time; and
    a journal storing area storing journal entries including a journal entry between the first point in time and the second point in time,
    wherein the computer system manages journal operations to record the journal entries, and monitors the journal storing area so as to free at least one of the stored journal entries in the journal storing area based on a predetermined criterion which enables data recovery by using at least the second snapshot and the stored journal entries,
    wherein based upon a command for generating marker information from the host computer, the computer system records marker information as being associated with the journal entries in the journal storing area, the marker information being independent of a write request,
    wherein based upon a command for getting marker information from the host computer, the computer system retrieves the recorded marker information for the host computer, and
    wherein when receiving a data recovery request specifying a specific one of the marker information representing a third point in time between the first point in time and the second point in time, if the computer system determines that the data recovery request can be performed based on the specific one of the marker information and the stored journal entries, the computer system copies the first snapshot to a recovery volume, selects at least one of the journal entries corresponding to the write operations conducted between the first point in time and the third point in time and recovers data of the portion of the data volume at the third point in time by using at least a portion of the selected at least one journal entry and the copied snapshot in the recovery volume.

2. The computer system of claim 1, wherein said computer system includes a plurality of said data volumes, and wherein the specific one of the marker information includes a first sequence number unique within said journal storing area, which corresponds to a journal group, and wherein sequence numbers are assigned to each write request, respectively.

3. The computer system of claim 1, wherein the snapshot storing area and/or the journal storing area are configured with storage volumes.

4. A computer system to be coupled to a host computer via a network, the computer system comprising:
   a data volume storing write data from the host computer;
   a snapshot storing area for storing a plurality of snapshots including a first snapshot of at least a portion of the data volume at a first point in time, and also storing a second snapshot of the portion of the data volume at a second point in time that is a latest snapshot among the stored snapshots; and
   a journal storing area storing an old journal entry before the first point in time, a journal entry between the first and second point in time, and another journal entry after the second point in time,
   wherein the journal storing area has a various amount of available space in which new journal entries can be written,
   wherein the computer system manages journal operations such that, if the amount of available space in the journal storing area falls below a predetermined threshold, then the amount of available space is increased by sequentially freeing journal entries beginning with the oldest journal entry until the amount of available space is no longer below the predetermined threshold,
   wherein if, during the increasing of the amount of available space, it becomes necessary to free said another journal entry after the second point in time, then said another journal entry is applied to the second snapshot to create a new snapshot before being made free,
   wherein based upon a command for generating marker information from the host computer, the computer system records marker information as being associated with the journal entries in the journal storing area, wherein the marker information is independent of a write request,
   wherein based upon a command for getting marker information from the host computer, the computer system retrieves the recorded marker information for the host computer, and
   wherein when receiving a data recovery request specifying a specific one of the marker information representing a target point in time between the first point in time and the second point in time, if the computer system determines whether recovery is possible, and if recovery is possible, the computer system uses a copy of the first snapshot in a recovery volume and at least a portion of the journal entry to perform recovery at the target point in time.

5. The computer system according to claim 4, wherein the snapshot storing area and/or the journal storing area are configured with storage volumes.

6. The computer system according to claim 4, wherein at least one of the journal entries are stored in the journal storing area before storing one of the plurality of snapshots in the snapshot storing area.

7. The computer system according to claim 4, wherein the first snapshot is prior to and closest in time to the target point in time.

8. A computer-implemented method of storing information in a computer system to be coupled to a host computer via a network, the method comprising the steps of:
   storing write data from the host computer to a data volume;
   storing, in a snapshot storing area, a first snapshot of at least a portion of the data volume at a first point in time, and also storing a second snapshot of the portion of the data volume at a second point in time subsequent to the first point in time; and
   storing, in a journal storing area, journal entries including a journal entry between the first point in time and the second point in time,
   wherein the computer system manages journal operations to record the journal entries, and monitors the journal storing area so as to free at least one of the stored journal entries in the journal storing area based on a predetermined criterion which enables data recovery by using at least the second snapshot and the stored journal entries,
   wherein based upon a command for generating marker information in the computer system from the host computer, the computer system records marker information as being associated with the journal entries in the journal storing area, wherein the marker information is independent of a write request,
   wherein based upon a command for getting marker information from the host computer, the computer system retrieves the recorded marker information for the host computer, and
   wherein when receiving a data recovery request specifying marker information representing a third point in time between the first point in time and the second point in time, if the computer system determines that the data recovery request can be performed based on the marker information and the stored journal entries, the computer system copies the first snapshot to a recovery volume, selects at least one of the journal entries corresponding to the write operations conducted between the first point in time and the third point in time and recovers data of the portion of the data volume at the third point in time by using at least a portion of the selected at least one journal entry and the copied snapshot in the recovery volume.

9. The computer-implemented method of claim 8, wherein the marker information includes a sequence number.

10. The computer-implemented method of claim 8, wherein the snapshot storing area and/or the journal storing area are configured with storage volumes.

11. A computer-implemented method of storing information in a computer system to be coupled to a host computer via a network, the method comprising the steps of:
   storing, in a data volume, write data from the host computer;
   storing, in a snapshot storing area, a plurality of snapshots including a first snapshot of at least a portion of the data volume at a first point in time, and also storing a second snapshot of the portion of the data volume at a second point in time that is a latest snapshot among the stored snapshots; and storing, in a journal storing area, an oldest journal entry before the first point in time, a journal entry between the first and second point in time, and another journal entry after the second point in time, wherein the journal storing area has a variable amount of available space in which new journal entries can be written, wherein the computer system manages journal operations such that, if the amount of available space in the journal storing area falls below a predetermined threshold, then the amount of available space is increased by sequentially freeing journal entries beginning with the oldest journal entry until the amount of available space is no longer below the predetermined threshold, wherein if, during the increasing of the amount of available space, it becomes necessary to free said another journal entry after the second point in time, then said another journal entry is applied to the second snapshot to create a new snapshot before being made free, wherein based upon a command for generating marker information in the computer system from the host computer, the computer system records marker information as being associated with the journal entries in the journal storing area, wherein the marker information is independent from a write request, wherein based upon a command for getting marker information from the host computer, the computer system retrieves the recorded marker information for the host computer, and wherein when receiving a data recovery request specifying a specific marker information at a target point in time between the first point in time and the second point in time, the computer system determines whether recovery is possible, and if recovery is possible, the computer system uses a copy of the first snapshot in a recovery volume and at least a portion of one journal entry to perform recovery at the target point in time.

12. The computer-implemented method of storing information according to claim 11, wherein the snapshot storing area and/or the journal storing area are configured with storage volumes.

13. The computer-implemented method of storing information according to claim 11, wherein at least one of the journal entries are stored in the journal storing area before storing one of the plurality of snapshots in the snapshot storing area.

14. The computer-implemented method of storing information according to claim 11, wherein the first snapshot is prior to and closest in time to the target point in time.

15. The computer system according to claim 1, wherein the specific one of the marker information includes a first sequence number unique within said journal storing area, which includes a journal group, and wherein sequence numbers are assigned to each write request.

16. The computer system according to claim 4, wherein the specific one of the marker information includes a first sequence number unique within said journal storing area, which includes a journal group, and wherein sequence numbers are assigned to each write request.

* * * * *